United States Patent
Jiang et al.

(10) Patent No.: US 12,327,015 B2
(45) Date of Patent: Jun. 10, 2025

(54) METHOD, APPARATUS, ELECTRONIC DEVICE, AND STORAGE MEDIUM FOR DYNAMIC COMMENT CONTROLLING

(71) Applicant: Beijing Zitiao Network Technology Co., Ltd., Beijing (CN)

(72) Inventors: Jingxuan Jiang, Beijing (CN); Ye Gao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/649,902

(22) Filed: Apr. 29, 2024

(65) Prior Publication Data

US 2024/0281131 A1    Aug. 22, 2024

Related U.S. Application Data

(63) Continuation of application No. PCT/CN2022/116144, filed on Aug. 31, 2022.

(30) Foreign Application Priority Data

Oct. 29, 2021   (CN) .......................... 202111276356.4

(51) Int. Cl.
G06F 3/0487   (2013.01)
G06F 3/0481   (2022.01)
G06F 3/0484   (2022.01)

(52) U.S. Cl.
CPC .......... *G06F 3/0487* (2013.01); *G06F 3/0481* (2013.01); *G06F 3/0484* (2013.01)

(58) Field of Classification Search
None
See application file for complete search history.

(56) References Cited

U.S. PATENT DOCUMENTS

| 6,529,951 B1* | 3/2003 | Okuyama | ......... H04L 12/40013 |
| | | | 370/257 |
| 2013/0044066 A1* | 2/2013 | Monteux | ............. G06F 3/04886 |
| | | | 345/173 |

(Continued)

FOREIGN PATENT DOCUMENTS

| CN | 106990891 A | 7/2017 |
| CN | 106998492 A | 8/2017 |

(Continued)

OTHER PUBLICATIONS

International Search Report in PCT/CN2022/116144, mailed Nov. 30, 2022, 4 pages.

(Continued)

*Primary Examiner* — Asher D Kells
*Assistant Examiner* — Gabriel Mercado
(74) *Attorney, Agent, or Firm* — Astute IP Law Group

(57) ABSTRACT

Embodiments of the present disclosure provide a method, apparatus, electronic device, and storage medium for dynamic comment controlling. The method comprises: playing a target video with an interactable interface element, wherein the interactable interface element contains a first input control and a second input control; and during the playing of the target video, controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information.

16 Claims, 4 Drawing Sheets

(56) References Cited

U.S. PATENT DOCUMENTS

| | | | | |
|---|---|---|---|---|
| 2014/0193793 A1* | 7/2014 | Ghosh | ............... | G09B 5/12 |
| | | | | 434/350 |
| 2014/0201201 A1* | 7/2014 | Song | ............... | G06F 16/9577 |
| | | | | 707/723 |
| 2015/0066919 A1* | 3/2015 | Park | ............... | G06F 16/434 |
| | | | | 707/724 |
| 2015/0356573 A1* | 12/2015 | Zadrozny | ............... | G06Q 30/0201 |
| | | | | 705/7.32 |
| 2022/0005304 A1* | 1/2022 | Murray | ............... | G07C 13/00 |
| 2023/0326115 A1* | 10/2023 | Xiao | ............... | H04N 21/431 |
| | | | | 345/473 |

FOREIGN PATENT DOCUMENTS

| | | | |
|---|---|---|---|
| CN | 107302717 | A | 10/2017 |
| CN | 109361946 | A | 2/2019 |
| CN | 109413484 | A | 3/2019 |
| CN | 109587545 | A | 4/2019 |
| CN | 112612439 | A | 4/2021 |
| CN | 113473208 | A | 10/2021 |
| CN | 114025225 | A | 2/2022 |
| CN | 114520924 | A | 5/2022 |
| TW | 201703513 | A | 1/2017 |
| WO | 2021136330 | A1 | 7/2021 |

OTHER PUBLICATIONS

Office Action in Chinese Patent Application No. 202111276356.4, mailed Aug. 23, 2022, 6 pages.

\* cited by examiner

METHOD, APPARATUS, ELECTRONIC DEVICE, AND STORAGE MEDIUM FOR DYNAMIC COMMENT CONTROLLING

CROSS-REFERENCE TO RELATED APPLICATIONS

The present application is a continuation of International Patent Application No. PCT/CN2022/116144, filed on Aug. 31, 2022, which claims priority to Chinese Patent Application No. 202111276356.4, filed with the Chinese Patent Office on Oct. 29, 2021, the entirety of which is incorporated herein by reference.

FIELD

Embodiments of the present disclosure relate to the field of computer technologies, and for example relate to a method, apparatus, electronic device, and storage medium for dynamic comment controlling.

BACKGROUND

In the related art, users can participate in video interactions via dynamic comments. However, the current display mode of dynamic comments corresponding to options is relatively single, which is unable to meet the diversified needs of users for dynamic comment interaction and affects the user experience.

SUMMARY

In order to at least address the above technical problems, embodiments of the present disclosure provide a method, apparatus, electronic device, and storage medium for dynamic comment controlling.

Embodiments of the present disclosure provide a method for dynamic comment controlling, which comprises: playing a target video with an interactable interface element, wherein the interactable interface element contains a first input control and a second input control; and during the playing of the target video, controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information.

Embodiments of the present disclosure further provide an apparatus for dynamic comment controlling, which comprises: a video playing module configured to play a target video with an interactable interface element, wherein the interactable interface element contains a first input control and a second input control; and a display controlling module configured to control, during the playing of the target video, a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information.

Embodiments of the present disclosure further provide an electronic device, which comprises: at least one processor; a memory configured to store at least one program; when the at least one program is executed by the at least one processor, the at least one processor performs the method of dynamic comment controlling according to the embodiments of the present disclosure.

Embodiments of the present disclosure further provide a computer-readable storage medium having a computer program stored thereon which, when executed by a processor, performs the method of dynamic comment controlling according to the embodiments of the present disclosure.

BRIEF DESCRIPTION OF THE DRAWINGS

In all accompanying drawings, the same or similar reference signs indicate the same or similar elements. It should be understood that the accompanying drawings are schematic and that the components and elements are not necessarily drawn to scale.

DETAILED DESCRIPTION

Embodiments of the present disclosure will be described below with reference to the accompanying drawings. Although some embodiments of the present disclosure are shown in the accompanying drawings, it should be understood that the present disclosure can be realized in a variety of forms and is not limited to the embodiments set forth herein. It should be understood that the accompanying drawings and embodiments of the present disclosure are for exemplary purposes only and are not intended to limit the protection scope of the present disclosure.

As used herein, the term "include" and variations thereof is open-ended, i.e., "including but not limited to". The term "based on" means "base at least in part on". The term "one embodiment" means "at least one embodiment"; the term "another embodiment" means "at least one further embodiment"; and the term "some embodiments" means "at least some embodiments". Relevant definitions of other terms will be given in the following description.

It should be noted that the concepts such as "first" and "second" as mentioned in the present disclosure are only used to distinguish different apparatuses, modules, or units, and are not used to limit the order or interdependence of functions performed by these apparatuses, modules, or units.

It should be noted that the modifications "one" and "a plurality of" as mentioned in the present disclosure are illustrative and not restrictive; and those skilled in the art should understand that, unless otherwise specified in the context, they should be understood as "one or more" if not.

The names of messages or information exchanged between a plurality of apparatuses in embodiments of the present disclosure are for illustrative purpose only and are not intended to limit the scope of these messages or information.

Figure 1:
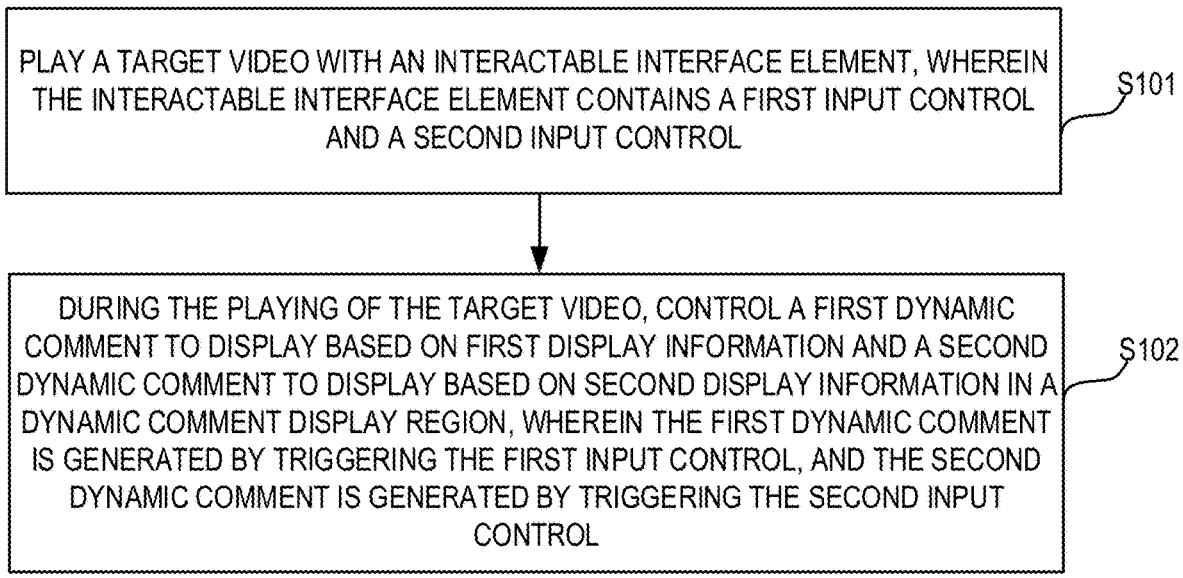
FIG. 1 is a schematic flowchart of a method of dynamic comment controlling according to embodiments of the present disclosure.

FIG. 1 is a schematic flowchart of a method of dynamic comment controlling according to embodiments of the present disclosure. The method may be performed by a dynamic comment control apparatus. The apparatus may be implemented in software and/or hardware and may be provided within an electronic device, such as in a cell phone or a tablet. The method of dynamic comment controlling according to the embodiments of the present disclosure is applicable to display control of dynamic comments corresponding to a plurality of options in a video sticker. As shown in FIG. 1, the method of dynamic comment controlling according to these embodiments may include following steps.

S101: A target video is played with an interactable interface element, where the interactable interface element contains a first input control and a second input control. In some embodiments, the interactable interface element comprises a sticker image, for example, a target video sticker. In some embodiments, at least one of the first input control and the second input control is corresponding to a selectable option. For example, the first input control is a first option, and the second input control is a second option.

The electronic device may play a target video in a video playback page in response to a triggering operation by a user to play the target video.

The target video is a video provided with a target video sticker. The target video sticker may be a poll-type video sticker. The target video sticker may be provided with a poll question and at least two options. The poll question and the options may be provided by a video author when adding the target video sticker to the target video. In the following, illustration will be made by taking the target video sticker with two options as an example. The first option and the second option are the two options provided in the target video sticker.

S102: During the playing of the target video, a first dynamic comment is controlled to display based on first display information and a second dynamic comment is controlled to display based on second display information in a dynamic comment display region. The first dynamic comment is generated by triggering the first input control, and the second dynamic comment is generated by triggering the second input control. The first display information is different from the second display information.

The display of the first and second dynamic comments are differentiated in their movement ways. In some embodiments, the first display information at least comprises first motion information, and the second display information at least comprises second motion information different from the first motion information. The first dynamic comment is controlled to display based on the first motion information, and the second dynamic comment is controlled to display based on the second motion information. As such, the first and second dynamic comments are moved in different ways.

In some embodiments, the first motion information and the second motion information are defined with at least one of different trajectories, different directions, different speeds, different termination points, or different start points. The first dynamic comment and the second dynamic comment in the target video are controlled to move along different trajectories, different directions, different speeds, different termination points, or different start points in the dynamic comment display region.

A first dynamic comment is a dynamic comment generated by triggering the first input control (e.g., the first option) provided in the target video sticker, and a second dynamic comment is a dynamic comment generated by triggering the second input control (e.g., the second option) provided in the target video sticker. The number of first dynamic comments and the number of second dynamic comments may be one or more. Different first dynamic comments may be generated and sent by different users triggering the first option while watching the target video, and different second dynamic comments may be generated and sent by different users triggering the second option while watching the target video. The first dynamic comments and the second dynamic comments may have the same or different display states (e.g., font, font size, and/or color, etc.). The dynamic comment display region may be a region in the video playback page for displaying dynamic comments in the target video. For example, when the target video is played in the full-screen playback mode, the dynamic comment display region may be located at the upper part of the video playback page.

In this embodiment, when dynamic comments corresponding to options within the target video sticker are presented in the dynamic comment display region, the dynamic comments corresponding to different options within the target video sticker are controlled to move in different directions within the dynamic comment display region. The dynamic comments corresponding to the different options are no longer controlled to move in the same direction within the dynamic comment display region. As a result, a diversified dynamic comment displaying mode can be achieved to satisfy diversified dynamic comment interaction demands of users, and provide convenience for the users to distinguish the dynamic comments corresponding to the different options, thereby improving the display effect of the dynamic comments and user experience.

The electronic device may play a target video. When the target video is played to a display time point of a dynamic comment corresponding to an option within the target video sticker, the dynamic comment can be displayed within the dynamic comment display region. For example, the dynamic comment is controlled to move from a predetermined position of the dynamic comment display region (such as, from a side of the dynamic comment display region or the center of the dynamic comment display region, and the like) into the dynamic comment display region. The dynamic comment is controlled to move along the trajectory corresponding to the option in the dynamic comment display region. For example, if the dynamic comment is the first dynamic comment corresponding to the first option in the target video sticker, the dynamic comment can be controlled to move along a first trajectory within the dynamic comment display region. If the dynamic comment is the second dynamic comment corresponding to the second option in the target video sticker, the dynamic comment can be controlled to move along a second trajectory that is different in direction from the first trajectory in the dynamic comment display region.

Here, the first trajectory and the second trajectory herein may be configured as required. For example, the first trajectory may be a movement trajectory moving from left to right, and the second trajectory may be a movement trajectory moving from right to left; or the first trajectory may be a horizontal movement trajectory, and the second trajectory may be a vertical movement trajectory. Alternatively, the first trajectory and the second trajectory may be two movement trajectories that move in the same direction but do not completely overlap. For example, in the dynamic comment display region, the first trajectory may be located above or below the second trajectory, and the like, and the embodiments are not limited in this regard.

In one embodiment, controlling the first dynamic comment and the second dynamic comment in the target video to move along different trajectories in the dynamic comment display region includes: controlling the first dynamic comment and the second dynamic comment in the target video to move in opposite directions in the dynamic comment display region.

In the above-mentioned embodiment, the dynamic comments corresponding to different options in the video can be controlled to move in opposite directions in the dynamic comment display region Therefore, it can not only provide the users with diversified dynamic comment displaying methods, but also make a collision effect for the dynamic comments generated by triggering different options, thereby improving the fun of the dynamic comment display.

The moving directions of the first dynamic comment and the second dynamic comment can be flexibly configured as desired. For example, the first dynamic comment may be configured to move from left to right or from right to left, and the second dynamic comment may be configured to move from right to left or from left to right. Alternatively, the first dynamic comment may be configured to move from up to down or from down to up, and the second dynamic comment may be configured to move from down to up or from up to down, and so on. In order to prevent the display of the dynamic comments from causing excessive interference to users watching video screens or performing triggering operations, and to make the display of the dynamic comments more in line with user habits of viewing the dynamic comments, the first dynamic comment may be configured to move from left to right/from right to left, and the second dynamic comment may be configured to move from right to left/from left to right. Under such a configuration, both the first dynamic comment and the second dynamic comment can be moved horizontally in the dynamic comment display region.

Figure 2:
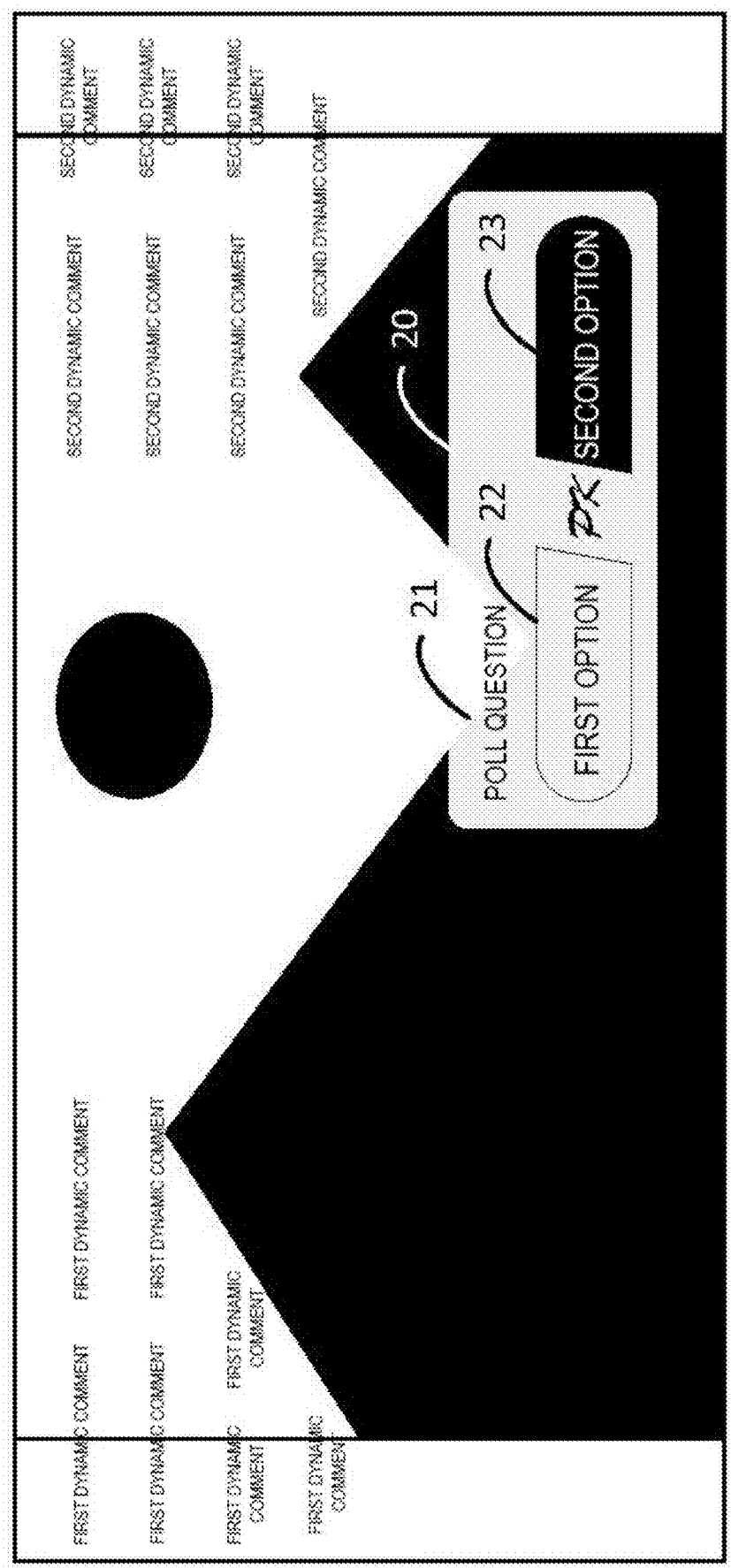
FIG. 2 is a schematic diagram of a video playback page according to embodiments of the present disclosure.

As an example, as shown in FIG. 2 (where first dynamic comments are moved from right to left and second dynamic comment are moved from left to right), during when a target video is played, if the video is played to a display time point of any first dynamic comment in the video, the electronic device may control the first dynamic comment to move into the dynamic comment display region in a left-to-right/right-to-left direction, and control the first dynamic comment to further move along this direction in the dynamic comment display region until it moves out of the dynamic comment display region. In addition, when the video is played to a display time point of any second dynamic comment in the video, the electronic device may control the second dynamic comment to move into the dynamic comment display region along the right-to-left/left-to-right direction, and control the second dynamic comment to further move along this direction in the dynamic comment display region until it moves out of the dynamic comment display region.

According to the method of dynamic comment controlling according to this embodiment, the target video with the target video sticker is played. The target video sticker herein contains the first option and the second option. During the playing of the target video, the first dynamic comment in the target video and the second dynamic comment in the target video are controlled to move in different directions in the dynamic comment display region. The first dynamic comment is generated by triggering the first option, and the second dynamic comment is generated by triggering the second option. In these embodiments, by adopting the above-mentioned solution, the dynamic comments generated by triggering different options in the target video sticker are controlled to move along different trajectories, which can provide diversified dynamic comment displaying methods to satisfy diversified dynamic comment interaction needs of users, and can also provide convenience for users to view and differentiate dynamic comments corresponding to different options, thereby improving the user experience.

Figure 3:
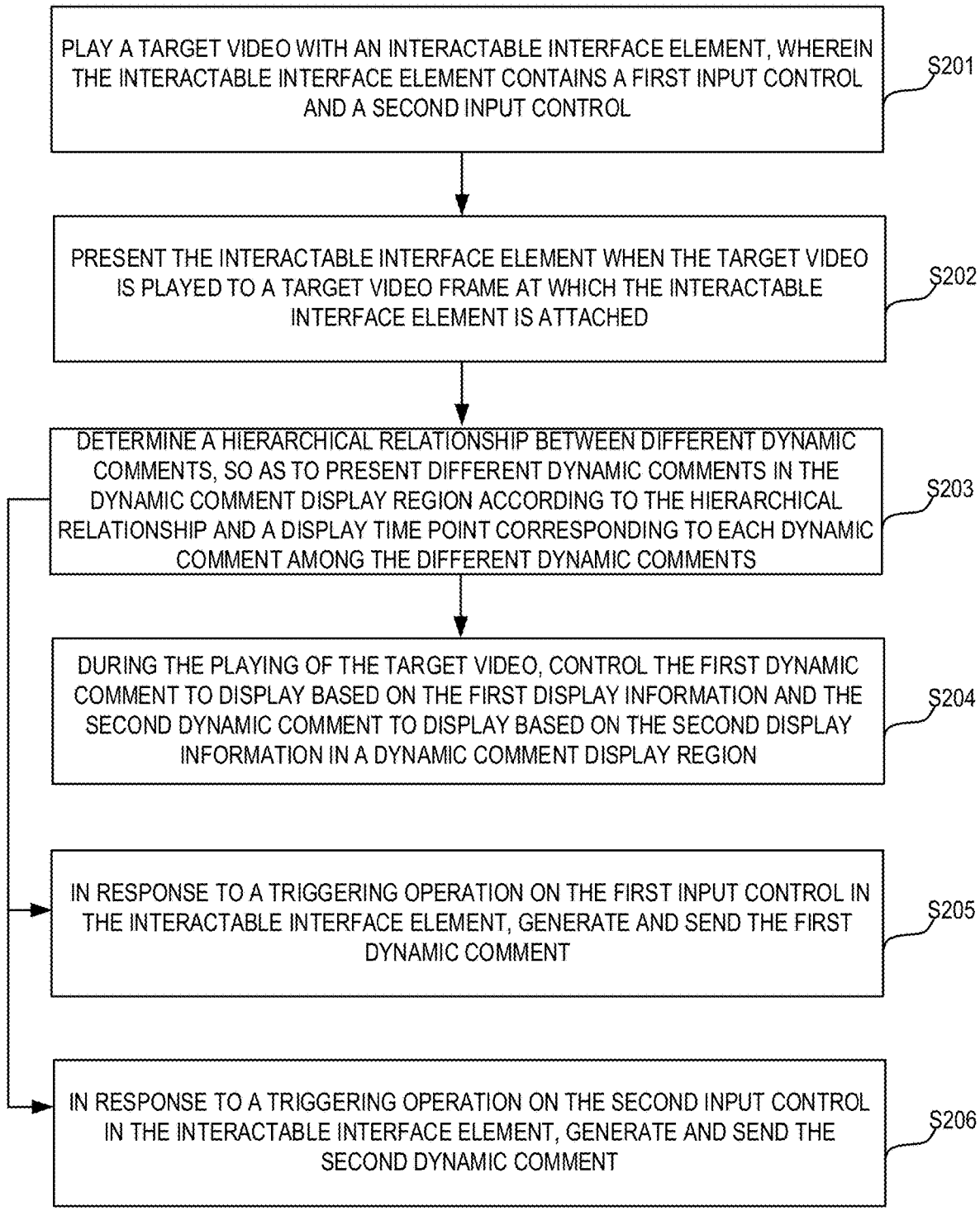
FIG. 3 is a schematic flowchart of another method of dynamic comment controlling according to embodiments of the present disclosure.

FIG. 3 is a schematic flowchart of another method of dynamic comment controlling according to embodiments of the present disclosure. The solution in these embodiments may be combined with one or more of the optional solutions in the above embodiments. Optionally, the method of dynamic comment controlling according to these embodiments further includes: presenting the target video sticker when the target video is played to a target video frame at which the target video sticker is added; generating and sending the first dynamic comment in response to a triggering operation on the first option in the target video sticker; and generating and sending the second dynamic comment in response to a triggering operation on the second option in the target video sticker.

Optionally, before controlling the first dynamic comment and the second dynamic comment in the target video to move along different trajectories in the dynamic comment display region, the method further includes: determining a hierarchical relationship between different dynamic comments, so as to present different dynamic comments in the dynamic comment display region according to the hierarchical relationship and a display time point corresponding to each dynamic comment among the different dynamic comments, where the different dynamic comments include the first dynamic comment and the second dynamic comment.

As shown in FIG. 3, the method of dynamic comment controlling according to this embodiment may include following steps.

S201: A target video is played with interactable interface element, where the interactable interface element contains a first input control and a second input control.

S202: The interactable interface element is present when the target video is played to a target video frame at which the interactable interface element is attached.

The target video frame may be a video frame attached with the interactable interface element (e.g., the target video sticker).

When creating the target video, the author of the target video may attach target video stickers to some video frame (s) of the target video to guide the users to interact through the target video stickers.

As shown in FIG. 2, the electronic device may, upon a video frame at which a target video sticker 20 is added has been displayed, display the video frame in the video playback page, such as displaying the video scene in the video frame and the target video sticker 20 added in the video frame in the video playback page. The electronic device may display a poll question 21 configured by the video author and a first option 22 and a second option 23 of the poll question 21 in the target video sticker 20 for the users to view the poll question 21 provided in the target video sticker and trigger the corresponding option of the poll question 21 to send a dynamic comment corresponding to the option.

S203: A hierarchical relationship between different dynamic comments is determined so as to present different dynamic comments in the dynamic comment display region according to the hierarchical relationship and a display time point corresponding to each dynamic comment among the different dynamic comments, and then S204, S205 or S206 is performed, where the different dynamic comments include a first dynamic comment and a second dynamic comment, the first dynamic comment being generated by triggering the first option, and the second dynamic comment being generated by triggering the second option.

In these embodiments, the hierarchical relationship between the different dynamic comments can be determined, so as to determine how to display the different dynamic comments when the different dynamic comments are moved to the same position. For example, if a determination that the display hierarchical layer of the first dynamic comment is higher than the display hierarchical layer of the second dynamic comment, the first dynamic comment is displayed at a higher hierarchy than the second dynamic comment. That is, the dynamic comment display plane where the first dynamic comment is located is located outward the display plane where the second dynamic comment is located, so as to prevent the first dynamic comment from being overlapped or partially overlapped by the second dynamic comment. If the display hierarchical layer of the first dynamic comment is lower than the display hierarchical layer of the second dynamic comment, the second dynamic comment is displayed at a higher hierarchy than the first dynamic comment. That is, the dynamic comment display plane where the second dynamic comment is located is located outward the display plane where the first dynamic comment is located, so as to prevent the second dynamic comment from being overlapped or partially overlapped by the first dynamic comment.

The hierarchical relationship between different dynamic comments can be understood as an upper/lower hierarchy relationship of the dynamic comment display planes where the different dynamic comments are located. The upper/lower hierarchy relationship between the dynamic comment display planes may be predetermined by the developer, or may be randomly determined, such as by randomly selecting dynamic comments corresponding to an option and setting it to have the highest display hierarchical layer among multiple dynamic comments. Or the upper/lower hierarchy relationship between the dynamic comment display planes may be may be determined according to the number of dynamic comments or the moving direction of the dynamic comments, such as by determining the larger/smaller number of dynamic comments among the first dynamic comments and the second dynamic comments as having the highest display hierarchical layer among the multiple dynamic comments or determining dynamic comments that move in a predetermined direction (e.g., right-to-left or left-to-right) in the dynamic comment display region to have the highest display hierarchical layer among the plurality of dynamic comments, and the like. The display time point corresponding to a dynamic comment may be a time point at which the dynamic comment begins to be displayed in the target video.

In an embodiment, determining the hierarchical relationship between different dynamic comments includes: if the number of first dynamic comments is greater than the number of second dynamic comments, determining the display hierarchical layer of the first dynamic comment to be higher than the display hierarchical layer of the second dynamic comment; and if the number of first dynamic comments is less than the number of second dynamic comments, determining the display hierarchical layer of the first dynamic comment to be lower than the display hierarchical layer of the second dynamic comment.

In above-mentioned embodiment, a larger number of the dynamic comments may be configured to have a higher hierarchy in the order of a larger number to a lower number of dynamic comments. In this way, by simply checking the upper and lower hierarchy relationship between the first dynamic comments and the second dynamic comments, the users are enabled to view a larger number of dynamic comments and also enable the users to quickly determine the relative numerical size of the users holding the viewpoint corresponding to the first option and the users holding the viewpoint corresponding to the second option, thereby further improving the user experience.

The number of first dynamic comments in the target video and the number of second dynamic comments in the target video may be acquired to determine whether the number of first dynamic comments is greater than the number of second dynamic comments. If the number of first dynamic comments is greater than the number of second dynamic comments, the display hierarchical layer of the first dynamic comment is configured to be higher than the display hierarchical layer of the second dynamic comment. When a first dynamic comment and a second dynamic comment are moved to the same position, the first dynamic comment is displayed on the upper hierarchy of the second dynamic comment. If the number of first dynamic comments is not greater than the number of second dynamic comments, the display hierarchical layer of the first dynamic comment is configured to be lower than the display hierarchical layer of the second dynamic comment. When a first dynamic comment and a second dynamic comment are moved to the same position, the second dynamic comment is displayed on the upper level of the first dynamic comment.

Furthermore, if there is a third dynamic comment(s) in the target video in addition to the first dynamic comment(s) and the second dynamic comment(s), such as when the target video has a third dynamic comment inputted by the user via an input box, a display hierarchical layer of the third dynamic comment may be configured as required. For example, the third dynamic comment may be configured to have the same display hierarchical layer as the higher/lower-layer dynamic comment among the first dynamic comment and the second dynamic comment; or configured to have the same display hierarchical layer as the dynamic comment that moves from right to left. Alternatively, the third dynamic comment may be configured to have the lowest display hierarchical layer among the first dynamic comment, the second dynamic comment, and the third dynamic comment, so that users can view the first dynamic comment and the second dynamic comment. Optionally, the different dynamic comments may further include a third dynamic comment. Then, determining the hierarchical relationship between the different dynamic comments may further include: determining the display hierarchical layer of the third dynamic comment to be lower than the display hierarchical layer of the first dynamic comment and lower than the display hierarchical layer of the second dynamic comment.

In these embodiments, the first dynamic comment and the second dynamic comment may also be configured to have the same hierarchical layer. When First Dynamic Comment A and Second Dynamic Comment B are moved to the same position, the display of First Dynamic Comment A and Second Dynamic Comment B moving to the same position may be stopped, or the display of one of First Dynamic Comment A and Second Dynamic Comment B moving to the same position may be stopped. As an example, the display of dynamic comments having a smaller/larger number may be stopped. For example, if the number of first dynamic comments is greater than the number of second dynamic comments, the display of First Dynamic Comment A or Second Dynamic Comment B may be stopped; and if the number of first dynamic comments is less than the number of second dynamic comments, the display of Second Dynamic Comment B or First Dynamic Comment A may be stopped. Alternatively, the display of the dynamic comments moving along a predetermined direction may be stopped. For example, among Second Dynamic Comment B and First Dynamic Comment A, the display of the dynamic comment moving from left to right/from right to left may be stopped.

S204: During the playing of the target video, the first dynamic comment is controlled to display based on the first display information and the second dynamic comment is controlled to display based on the second display information. In some embodiments, the first dynamic comment and the second dynamic comment in the target video are controlled to move along different trajectories in the dynamic comment display region during the playing of the target video.

S205: In response to a triggering operation on the first input control (e.g., the first option) in the interactable interface element, the first dynamic comment is generated and sent.

S206: In response to a triggering operation on the second input control (e.g., the second option) in the interactable interface element, the second dynamic comment is generated and sent.

In this embodiment, after the target video sticker is displayed, the users may send dynamic comments corresponding to the options through the different options in the target video sticker.

As an example, as shown in FIG. 2, the electronic device plays the target video sticker 20 in the video playback page, and displays the poll question 21 configured by the video author and the first option 22 and the second option 23 of the poll question 21 in the target video sticker 20. Thus, when the user supports the viewpoint corresponding to the first option 22 more and wants to vote for the first option 22, he or she may trigger the first option 22. The electronic device, upon detecting that the user triggers the first option 22, may generate and send a first dynamic comment corresponding to the first option 22. The electronic device may control the first dynamic comment to move from one side (e.g., from the left side) of the dynamic comment display region into the dynamic comment display region in a direction (e.g., from the left to the right) corresponding to the first option, and further move in the direction in the dynamic comment display region until moving out of the dynamic comment display region. When the user supports the viewpoint corresponding to the second option 23 more and wants to vote for the second option 23, the user may trigger the second option 23. The electronic device, upon detecting that the user triggers the second option 23, may generate and send a second dynamic comment corresponding to the second option 23. The electronic device may control the second dynamic comment to move from one side (e.g., the right side) of the dynamic comment display region into the dynamic comment display region in a direction (e.g., from right to left) corresponding to the second option, and further move in the direction in the dynamic comment display region until moving out of the dynamic comment display region.

In the method of dynamic comment controlling according to this embodiment, the dynamic comment corresponding to the option is generated and sent based on the user's triggering operation of the option, and the dynamic comments corresponding to different options are displayed in different hierarchies, so that the dynamic comments corresponding to different options can be displayed in a clear and concise manner, improving the convenience for users to view the dynamic comments corresponding to different options, and improving the user experience.

Figure 4:
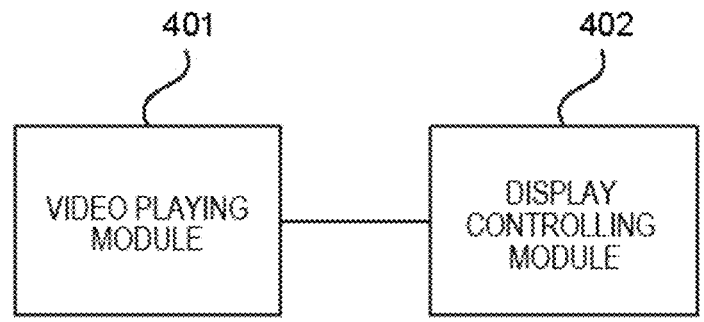
FIG. 4 is a structural block diagram of an apparatus for dynamic comment controlling according to embodiments of the present disclosure.

FIG. 4 is a schematic flowchart of an apparatus for dynamic comment controlling according to embodiments of the present disclosure. The apparatus may be implemented in software and/or hardware, may be configured in an electronic device, such as a cell phone or a tablet, and may control the dynamic comments to move in different directions by performing the method of dynamic comment controlling. As shown in FIG. 4, the apparatus for dynamic comment controlling according to these embodiments may include: a video playing module 401 and a display controlling module 402. The video playing module 401 is configured to play a target video with an interactable interface element, wherein the interactable interface element contains a first input control and a second input control. The display controlling module 402 is configured to control, during the playing of the target video, a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information.

In the apparatus for dynamic comment controlling according to these embodiments, a target video with a target video sticker is played by the video playing module. The target video sticker contains a first option and a second option. During the playing of the target video, the first dynamic comment in the target video and the second dynamic comment in the target video are controlled by the display controlling module to move in different directions in a dynamic comment display region. The first dynamic comment is generated by triggering the first option, and the second dynamic comment is generated by triggering the second option. In such embodiments, by adopting afraid technical solutions, the dynamic comments generated by triggering different options in the target video sticker are controlled to move along different trajectories, which can provide diversified dynamic comment displaying methods to satisfy diversified dynamic comment interaction needs of users, and can provide convenience for users to view and differentiate dynamic comments corresponding to different options, thereby improving the user experience.

In some embodiments of the above-mentioned solution, the first display information at least comprises first motion information, and the second display information at least comprises second motion information different from the first motion information.

In some embodiments of the above-mentioned solution, the first motion information and the second motion information are defined with at least one of different trajectories, different directions, different speeds, different termination points, or different start points.

In above-mentioned solution, the display controlling module 402 is configured to control the first dynamic comment and the second dynamic comment in the target video to move in opposite directions in the dynamic comment display region.

In some embodiments of the above-mentioned solution, the first dynamic comment and the second dynamic comment may both move laterally in the dynamic comment display region.

The apparatus for dynamic comment controlling according to this embodiment may further include: an element presenting module configured to present the interactable interface element when the target video is played to a target video frame at which the interactable interface element is attached; a first dynamic comment sending module configured to, in response to a triggering operation on the first input control in the interactable interface element, generating and sending a first dynamic comment; and a second dynamic comment sending module configured to, in response to a triggering operation on the second input control in the interactable interface element, generating and sending a second dynamic comment.

The apparatus for dynamic comment controlling according to this embodiment may further include: a hierarchical determining module configured to determine a hierarchical relationship between different dynamic comments, so as to present different dynamic comments in the dynamic comment display region according to the hierarchical relationship and a display time point corresponding to each dynamic comment among the different dynamic comments. The different dynamic comments herein include the first dynamic comment and the second dynamic comment.

In some embodiments of the above-mentioned solution, the hierarchy determining module is configured to: if a determination that the number of first dynamic comments is greater than the number of second dynamic comments, determine the display hierarchical layer of the first dynamic comment to be higher than the display hierarchical layer of the second dynamic comment; and if the number of first dynamic comments is less than the number of second dynamic comments, determine the display hierarchical layer of the first dynamic comment to be lower than the display hierarchical layer of the second dynamic comment.

In some embodiments of the above-mentioned solution, the different dynamic comments may further include a third dynamic comment, and the hierarchy determining module is configured to: determine a display hierarchical layer of the third dynamic comment to be lower than the display hierarchical layer of the first dynamic comment and lower than the display hierarchical layer of the second dynamic comment.

In some embodiments of the above-mentioned solution, the interactable interface element comprises a sticker image. In some embodiments of the above-mentioned solution, at least one of the first input control and the second input control is corresponding to a selectable option.

The apparatus for dynamic comment controlling according to embodiments of the present disclosure may execute the method of dynamic comment controlling according to any embodiment of the present disclosure, and has corresponding functional modules and effects for executing the method of dynamic comment controlling. Technical details not exhaustively described in these embodiments can be found in the method of dynamic comment controlling according to any embodiments of the present disclosure.

Figure 5:
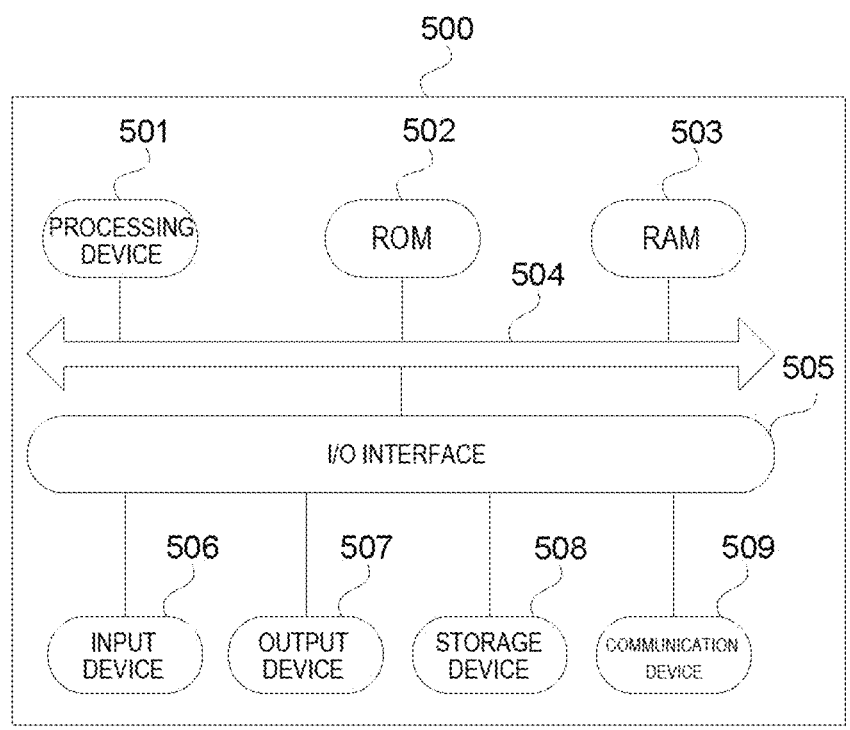
FIG. 5 is a schematic structural diagram of an electronic device according to embodiments of the present disclosure.

Reference will be made to FIG. 5 below, which illustrates a schematic structural diagram of an electronic device (such as a terminal device) 500 for implementing embodiments of the present disclosure. The terminal devices according to embodiments of the present disclosure may include, but are not limited to, mobile terminals such as mobile phones, notebook computers, digital broadcast receivers, personal digital assistants (PDA), tablet computer PADs, portable medium players (PMP), in-vehicle terminals (e.g., in-vehicle navigation terminals) and so forth, and fixed terminals such as digital TVs, desktop computers and so forth. The electronic device shown in FIG. 5 is only an example and should not impose any limitation on the functions and application scope of embodiments of the present disclosure.

As shown in FIG. 5, the electronic device 500 may include a processing device (e.g., a central processor, a graphics processor, etc.) 501. The electronic device 500 may perform a variety of actions and processes based on a program stored in a read-only memory (ROM) 502 or loaded from a storage device 508 into a random access memory (RAM) 503. The RAM 503 further stores various programs and data required for the operation of the electronic device 500. The processing device 501, ROM 502, and RAM 503 are connected to each other via a bus 504. An input/output (I/O) interface 505 is also connected to the bus 504.

Generally, the following means may be connected to the I/O interface 505: an input device 506 including, for example, a touch screen, a touch pad, a keyboard, a mouse, a camera, a microphone, an accelerometer, a gyroscope, and the like; an output device 507 including, for example, a liquid crystal display (LCD), a loudspeaker, a vibrator, and the like; a storage device 508 including, for example, a magnetic tape, a hard disk, and the like; and a communication device 509. The communication device 509 may allow the electronic device 500 to communicate wirelessly or wiredly with other devices to exchange data. Although FIG. 5 illustrates the electronic device 500 with various means, it should be understood that it is not required to implement or have all of the illustrated means; and more or fewer means may alternatively be implemented or provided.

According to embodiments of the present disclosure, the process described below with reference to the flowchart may be implemented as a computer software program. For example, embodiments of the present disclosure include a computer program product including a computer program embodied on a non-transient computer-readable medium, and the computer program contains program codes for performing the method shown in the flowchart. In such an embodiment, the computer program may be downloaded and installed from a network via the communication device 509, or installed via the storage device 508, or installed via ROM 502. When the computer program is executed by the processing device 501, performs the above-mentioned functions defined in the method according to embodiments of the present disclosure are performed.

It should be noted that the computer-readable medium as stated above in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. The computer-readable storage medium may include, but is not limited to: an electrical connection with one or more wires, a portable computer disk, a hard disk, RAM, ROM, an erasable programmable read-only memory (EPROM) or flash memory, an optical fiber, a portable compact disk read-only memory (CD-ROM), an optical storage device, a magnetic storage device, or any combination thereof. In the present disclosure, the computer-readable storage medium may be any tangible medium containing a stored program for use by or in conjunction with an instruction executing system, apparatus, or device. In addition, in the present disclosure, the computer-readable signal medium may include a data signal propagated in a baseband or as a carrier wave, and the computer-readable signal medium carries computer-readable program codes. Such propagated data signals may take a variety of forms, including but not limited to electromagnetic signals, optical signals, or any combination thereof. The computer-readable signal medium may also be any computer-readable medium other than a computer-readable storage medium, and the computer-readable signal medium can send, propagate, or transmit the program for use by or in conjunction with the instruction executing system, apparatus, or device. The program codes included on the computer-readable medium may be transmitted using any medium, including but not limited to wires, optic cables, radio frequency (RF), and the like, or any combination thereof.

In some embodiments, the client, server may communicate utilizing any currently known or future developed network protocol such as Hypertext Transfer Protocol (HTTP), and may be interconnected by any form or medium of digital data communication (e.g., communication networks). Examples of the communication networks include local area networks (LANs), wide area networks (WANs), inter-networks (e.g., the Internet), end-to-end networks (e.g., ad-hoc end-to-end networks), and any currently known or future developed network.

The above-mentioned computer-readable medium may be included in the electronic device above, or may be present alone without being assembled into the electronic device.

The computer-readable medium carries one or more programs, and when the one or more programs are executed by the electronic device, the electronic device performs following steps: playing a target video with an interactable interface element, wherein the interactable interface element contains a first input control and a second input control; and during the playing of the target video, controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information.

The computer program codes for performing the operations of the present disclosure may be written in one or more programming languages or combinations thereof. The programming languages include, but are not limited to, object-oriented programming languages such as Java, Smalltalk, and C++, and also include conventional procedural programming languages such as the "C" language or the like. The program codes may be executed entirely on the user's computer, partly on the user's computer, as a stand-alone software package, partly on the user's computer and partly on a remote computer, or entirely on a remote computer or server. In a case of involving a remote computer, the remote computer may be connected to the user's computer through any kind of network including a local area network (LAN) or wide area network (WAN), or may be connected to an external computer (such as through the Internet using an Internet service provider).

The flowcharts and block diagrams in the accompanying drawings illustrate the architecture, functionality, and operation of possible implementations of the system, method, and computer program product according to various embodiments of the present disclosure. Each block in the flowchart or block diagram may represent a module, program segment, or portion of code that contains one or more executable instructions for implementing a prescribed logical function. It shall also be noted that, in some alternative implementations, the functions noted in the blocks may occur in an order different from the order noted in the accompanying drawings. For example, two blocks showed one after the other may actually be executed in parallel, or they may sometimes be executed in the reverse order, depending on the functionality involved. It shall be noted that each block in the block diagram and/or flowchart and the combinations of blocks in the block diagram and/or flowchart, may be implemented with a dedicated hardware-based system that performs the specified functions or operations, or may be implemented with a combination of dedicated hardware and computer instructions.

The units described in embodiments of the present disclosure may be implemented either by means of software or by means of hardware. The name of the module herein does not constitute a limitation to the unit itself.

The functions described above herein may be performed at least in part by one or more hardware logic units. For example, without limitation, example types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, the machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, a magnetic, optical, electromagnetic, infrared semiconductor system, apparatus, or device, or any suitable combination thereof. The machine-readable storage medium may include an electrical connection based on one or more wires, a portable computer disk, a hard disk, RAM, ROM, EPROM or flash memory, optical fiber, CD-ROM, optical storage device, magnetic storage device, or any combination thereof.

According to one or more embodiments of the present disclosure, Example 1 provides a method of dynamic comment controlling, comprising: playing a target video with a target video sticker, wherein the target video sticker contains a first option and a second option; and during the playing of the target video, controlling a first dynamic comment and a second dynamic comment in the target video to move along different trajectories in a dynamic comment display region, wherein the first dynamic comment is generated by triggering the first option, and the second dynamic comment is generated by triggering the second option.

According to one or more embodiments of the present disclosure, Example 2 of the method according to Example 1, wherein the controlling a first dynamic comment and a second dynamic comment in the target video to move along different trajectories in a dynamic comment display region comprises: controlling the first dynamic comment and the second dynamic comment in the target video to move in opposite directions in the dynamic comment display region.

According to one or more embodiments of the present disclosure, Example 3 of the method according to Example 2, wherein the first dynamic comment and the second dynamic comment both move laterally in the dynamic comment display region.

According to one or more embodiments of the present disclosure, Example 4 of the method according to Example 1, further comprising: presenting the target video sticker when the target video is played to a target video frame at which the target video sticker is added;

in response to a triggering operation on the first option in the target video sticker, generating and sending a first dynamic comment; and in response to a triggering operation on the second option in the target video sticker, generating and sending a second dynamic comment.

According to one or more embodiments of the present disclosure, Example 5 of the method according to any of Examples 1-4, wherein before the controlling a first dynamic comment and a second dynamic comment in the target video to move along different trajectories in a dynamic comment display region, the method further comprises: determining a hierarchical relationship between different dynamic comments, so as to present different dynamic comments in the dynamic comment display region according to the hierarchical relationship and a display time point corresponding to each dynamic comment among the different dynamic comments, wherein the different dynamic comments comprise the first dynamic comment and the second dynamic comment.

According to one or more embodiments of the present disclosure, Example 6 of the method according to Example 5, wherein the determining a hierarchical relationship between different dynamic comments comprises: if the number of first dynamic comments is greater than the number of second dynamic comments, determining a display hierarchical layer of the first dynamic comment to be higher than a display hierarchical layer of the second dynamic comment; and if the number of first dynamic comments is less than the number of second dynamic comments, determining the display hierarchical layer of the first dynamic comment to be lower than the display hierarchical layer of the second dynamic comment.

According to one or more embodiments of the present disclosure, Example 7 of the method according to Example 5, wherein the different dynamic comments further comprise a third dynamic comment, and the determining a hierarchical relationship between different dynamic comments comprises: determining a display hierarchical layer of the third dynamic comment to be lower than a display hierarchical layer of the first dynamic comment and lower than a display hierarchical layer of the second dynamic comment.

According to one or more embodiments of the present disclosure, Example 8 provides an apparatus for dynamic comment controlling, comprising: a video playing module configured to play a target video with a target video sticker, wherein the target video sticker contains a first option and a second option; and a display controlling module configured to control, during the playing of the target video, a first dynamic comment and a second dynamic comment in the target video to move along different trajectories in a dynamic comment display region, wherein the first dynamic comment is generated by triggering the first option, and the second dynamic comment is generated by triggering the second option.

According to one or more embodiments of the present disclosure, Example 9 provides an electronic device, comprising: at least one processor; a memory configured to store at least one program; when the at least one program is executed by the at least one processor, the at least one processor performs the method of dynamic comment controlling according to any of Examples 1-7.

According to one or more embodiments of the present disclosure, Example 10 provides a computer-readable storage medium having a computer program stored thereon which, when executed by a processor, performs the method of dynamic comment controlling according to any of Examples 1-7.

We claim:

1. A method of dynamic comment controlling, comprising:
   playing a target video with an element contains containing a first input control and a second input control; and
   controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information;
   wherein the controlling a first dynamic comment to display based on first display information and a second dynamic comment to display based on second display information in a dynamic comment display region comprises:
   controlling the first dynamic comment and the second dynamic comment to move in opposite directions in the dynamic comment display region.

2. The method of claim 1, further comprising:
   presenting the element when the target video is played to a target video frame at which the element is attached;
   in response to a triggering operation on the first input control in the element, generating and sending a first dynamic comment; and
   in response to a triggering operation on the second input control in the element, generating and sending a second dynamic comment.

3. The method of claim 1, wherein before the controlling a first dynamic comment to display based on first display information and a second dynamic comment to display based on second display information in a dynamic comment display region, the method further comprises:
   determining a hierarchical relationship between different dynamic comments, so as to present different dynamic comments in the dynamic comment display region according to the hierarchical relationship and a display time point corresponding to each dynamic comment among the different dynamic comments, wherein the different dynamic comments comprise the first dynamic comment and the second dynamic comment.

4. The method of claim 3, wherein the different dynamic comments comprise at least one first dynamic comment and at least one second dynamic comment, the first dynamic comment is one of the at least one first dynamic comment and the second dynamic comment is one of the at least one first dynamic comment, and wherein the determining a hierarchical relationship between different dynamic comments comprises:
   if a number of the at least one first dynamic comment is greater than a number of the at least one second dynamic comment, determining a display hierarchical layer of the first dynamic comment to be higher than a display hierarchical layer of the second dynamic comment; and
   if the number of the at least one first dynamic comment is less than the number of the at least one second dynamic comment, determining the display hierarchical layer of the first dynamic comment to be lower than the display hierarchical layer of the second dynamic comment;

the number of the at least one first dynamic comments and the number of the at least one second dynamic comment are one or more.

5. The method of claim 3, wherein the different dynamic comments further comprise a third dynamic comment, and the determining a hierarchical relationship between different dynamic comments comprises:

determining a display hierarchical layer of the third dynamic comment to be lower than a display hierarchical layer of the first dynamic comment and lower than a display hierarchical layer of the second dynamic comment.

6. The method of claim 1, wherein the element comprises a sticker image; and wherein at least one of the first input control and the second input control is corresponding to a selectable option.

7. The method of claim 1, wherein the first display information at least comprises first motion information, and the second display information at least comprises second motion information different from the first motion information, and the first motion information and the second motion information are defined with at least one of different trajectories, different speeds, different termination points, or different start points.

8. The method of claim 1, wherein the first dynamic comment and the second dynamic comment both move laterally in the dynamic comment display region.

9. An electronic device, comprising:
at least one processor; and
a memory configured to store at least one program;
when the at least one program is executed by the at least one processor, the at least one processor performs acts comprising:
playing a target video with an element containing a first input control and a second input control; and
controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information,
wherein the controlling a first dynamic comment to display based on first display information and a second dynamic comment to display based on second display information in a dynamic comment display region comprises:
controlling the first dynamic comment and the second dynamic comment to move in opposite directions in the dynamic comment display region.

10. The device of claim 9, wherein the acts further comprise:
presenting the element when the target video is played to a target video frame at which the element is attached;
in response to a triggering operation on the first input control in the element, generating and sending a first dynamic comment; and
in response to a triggering operation on the second input control in the element, generating and sending a second dynamic comment.

11. The device of claim 9, wherein before the controlling a first dynamic comment to display based on first display information and a second dynamic comment to display based on second display information in a dynamic comment display region, the acts further comprise:
determining a hierarchical relationship between different dynamic comments, so as to present different dynamic comments in the dynamic comment display region according to the hierarchical relationship and a display time point corresponding to each dynamic comment among the different dynamic comments, wherein the different dynamic comments comprise the first dynamic comment and the second dynamic comment.

12. The device of claim 11, wherein the different dynamic comments comprise at least one first dynamic comment and at least one second dynamic comment, the first dynamic comment is one of the at least one first dynamic comment and the second dynamic comment is one of the at least one first dynamic comment, and wherein the determining a hierarchical relationship between different dynamic comments comprises:

if a number of the at least one first dynamic comments is greater than a number of the at least one second dynamic comments, determining a display hierarchical layer of the first dynamic comment to be higher than a display hierarchical layer of the second dynamic comment; and if the number of the at least one first dynamic comments is less than the number of the at least one second dynamic comments, determining the display hierarchical layer of the first dynamic comment to be lower than the display hierarchical layer of the second dynamic comment;

the number of the at least one first dynamic comments and the number of the at least one second dynamic comments are one or more.

13. The device of claim 11, wherein the different dynamic comments further comprise a third dynamic comment, and the determining a hierarchical relationship between different dynamic comments comprises:

determining a display hierarchical layer of the third dynamic comment to be lower than a display hierarchical layer of the first dynamic comment and lower than a display hierarchical layer of the second dynamic comment.

14. The electronic device of claim 9, wherein the first display information at least comprises first motion information, and the second display information at least comprises second motion information different from the first motion information, and the first motion information and the second motion information are defined with at least one of different trajectories, different speeds, different termination points, or different start points.

15. The device of claim 9, wherein the first dynamic comment and the second dynamic comment both move laterally in the dynamic comment display region.

16. A non-transitory computer-readable storage medium having a computer program stored thereon which, when executed by a processor, performs acts comprising:
playing a target video with an element containing a first input control and a second input control; and
controlling a first dynamic comment to display based on first display information and a second dynamic comment to display based on second display information in a dynamic comment display region, wherein the first dynamic comment is generated by triggering the first input control, and the second dynamic comment is generated by triggering the second input control, and wherein the first display information is different from the second display information;

wherein the controlling a first dynamic comment to display based on first display information and a second dynamic comment to display based on second display information in a dynamic comment display region comprises:

controlling the first dynamic comment and the second dynamic comment to move in opposite directions in the dynamic comment display region.

\* \* \* \* \*